Oct. 20, 1925.
W. E. DUNSTON
BUMPER SUPPORTING MEANS
Filed Nov. 19, 1923
1,558,253
3 Sheets-Sheet 2
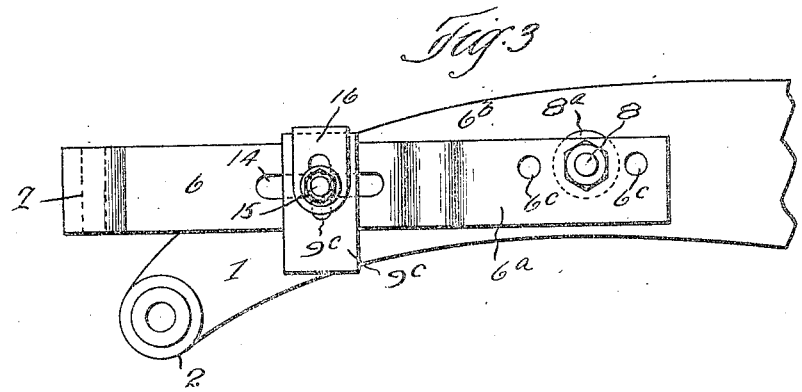
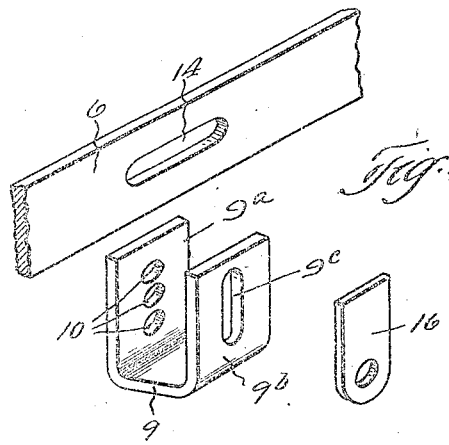
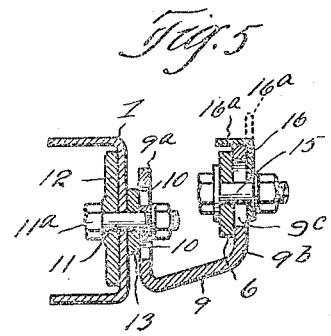
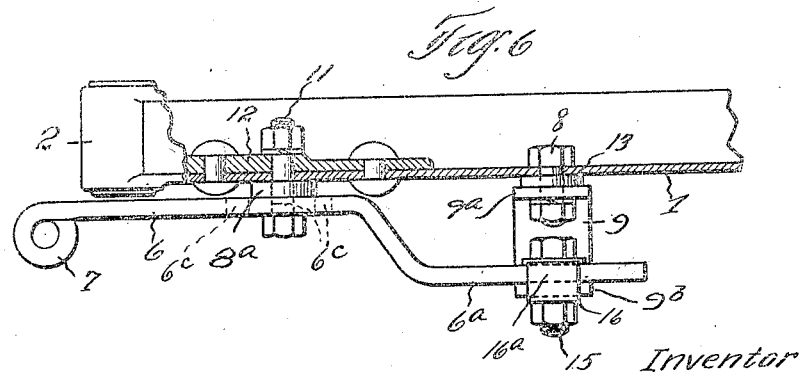
Inventor
Wayne E. Dunston,
By Hull, Brock & West.
Attys Oct. 20, 1925.
W. E. DUNSTON
1,558,253
BUMPER SUPPORTING MEANS
Filed Nov. 19, 1923    3 Sheets-Sheet 3
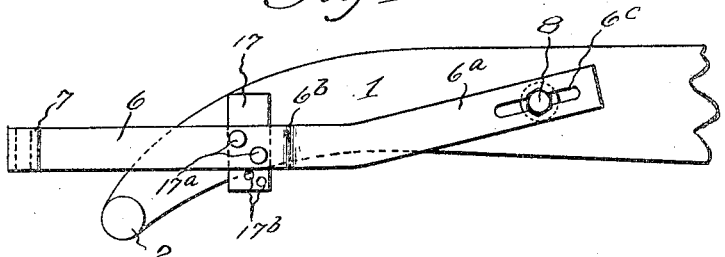
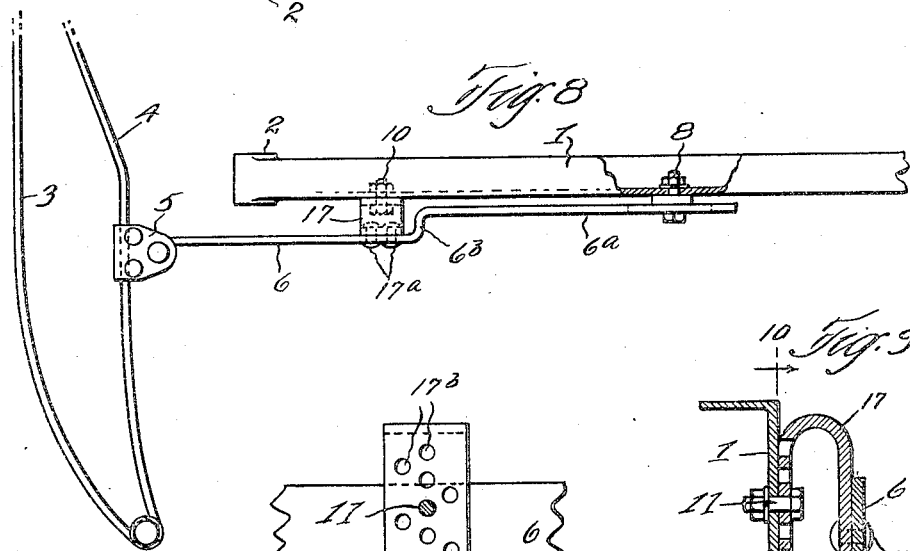
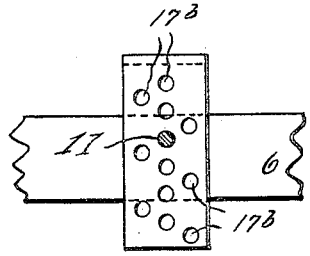
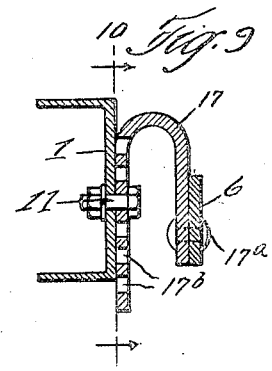
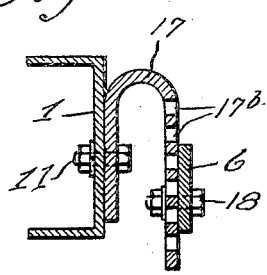
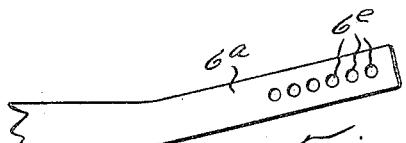
Inventor
Wayne E. Dunston,
By Hull, Brock & West.
Attys.

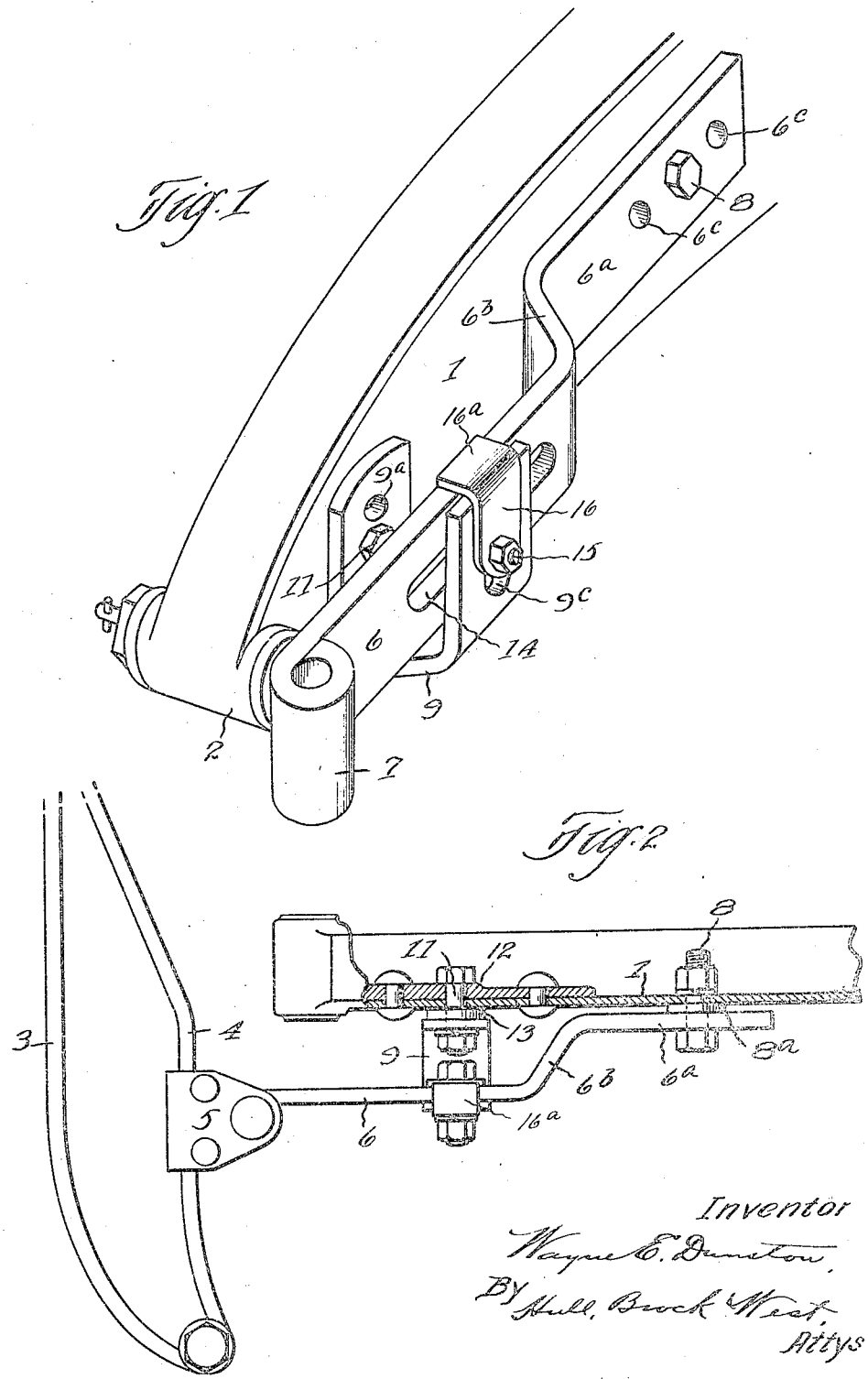

Patented Oct. 20, 1925.

1,558,253

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER-SUPPORTING MEANS.

Application filed November 19, 1923. Serial No. 675,555.

*To all whom it may concern:*

Be it known that I, WAYNE E. DUNSTON, a citizen of the United States, residing at Detroit, in the county of Wayne and State of Michigan, have invented a certain new and useful Improvement in Bumper-Supporting Means, of which the following is a full, clear, and exact description, reference being had to the accompanying drawings.

This invention relates to bumpers for automobiles and like vehicles, and has for its general object to provide simple and efficient means for adjustably securing such bumpers to the side frame members of such vehicles.

I accomplish the foregoing object in and through the construction and arrangement of parts shown in the drawings, wherein Fig. 1 represents a perspective view of the front end of one of the side members of an automobile showing a bumper-supporting arm secured thereto in accordance with my invention; Fig. 2 a sectional plan view of the parts shown in Fig. 1; Fig. 3 a side elevation of the parts shown in Fig. 1; Fig. 4 a detail in perspective of a portion of the bumper-supporting arm, together with the bracket and lock-plate; Fig. 5 a detail in section through the frame member, bracket, lock plate and supporting frame; Fig. 6, a view similar to Fig. 2, of a modification of the invention shown in the preceding views; Figs. 7, 8 and 9 are views, similar to Figs. 3, 2 and 5, respectively, of a further modification of my invention; Fig. 10 a sectional detail corresponding to the line 10—10 of Fig. 9; Fig. 11 a view, similar to Figs. 5 and 9, of a still further modification of my invention; and, Fig. 12, a detail in elevation showing a modification of the rear or inner end of the bumper-carrying arm.

Describing the various parts by reference characters and in connection with Figs. 1–5, inclusive, 1 denotes the front end portion of one of the side members of an automobile, said member having at its front end the usual spring-bolt eye 2; 3 denotes the front or impact bar of a bumper and 4 denotes the rear bar thereof. The bumper is shown as supported by means of a clamp 5 connected to the rear bar 4 adjacent to each end thereof, each clamp in turn being pivotally supported from an eye 7 at the front or outer end of an arm having a front portion 6 and a rear portion 6ª, the said portions being connected by an inwardly extending portion 6ᵇ, the rear end of the arm being provided with a plurality of longitudinally spaced apertures 6ᶜ by means of which the arm may be adjustably connected to the side member by means of a bolt 8, this adjustable connection permitting the arm to be moved inwardly and outwardly with respect to the frame member 1, with corresponding variations in the distance at which the bumper is supported in front of the side members 1. The bolt 8 extends through one of the apertures 6ᶜ in the rear portion of the arm, through a washer 8ª between the said arm and the side member 1, and through the web of said side member.

For the purpose of adjustably supporting the front or outer portion 6 of the arm from the member 1 and for properly spacing such portion from such member, the following construction is provided:—

9 denotes the intermediate portion of a U-shaped bracket having an inner vertical arm 9ª and an outer vertical arm 9ᵇ. The inner arm 9ª is provided with a series of vertically arranged spaced apertures 10, each adapted to receive a bolt 11. The head 11ª of this bolt is shown as located within the channel member 1. The bolt 11 extends through an aperture in a bearing plate 12 riveted to and within the channel and through aligned apertures in the web of the channel and in a washer 13, the outer end of the bolt passing through one of the apertures 10 in the inner arm of the bracket 9. The front portion 6 of the bumper-supporting arm is provided with the longitudinal slot 14, and the outer arm 9ᵇ of the bracket is provided with a vertical slot 9ᵉ, these slots receiving a bolt 15 by means of which the front or outer end of the arm 6 may be adjusted vertically about the bolt 8 as a pivot.

The outer end of the bolt also extends through a locking plate 16, of sheet metal, which, when the arm is finally positioned, is hammered down over the top of the bracket arm 9ᵇ, as indicated in full lines at 16ª in Fig. 5, thereby to retain the front portion 6 of the supporting arm in the position to which it has been set by the bolt 15.

The position of the top of the plate 16, prior to bending, is indicated in dotted lines in Fig. 5.

By the embodiment of my invention hereinbefore described, I am enabled to apply a bumper-supporting arm in properly adjusted and spaced relation with respect to the side member of an automobile and to accomplish this result by means of a construction which is capable of economic production and which will retain the parts firmly in place and without liability to rattle. It will be noted that two vertical adjustments are provided for the outer end of the arm 6, such adjustments being realized by the vertically-spaced apertures 10 in one arm of the bracket and the vertical slot 9ᶜ in the opposite arm thereof.

In Fig. 6, there is shown a modification of my invention wherein the rear portion 6ᵃ of the bumper-supporting arm is offset outwardly, instead of inwardly, while the front portion 6 is offset inwardly. In this case, the positions of the washer 8ᵃ and of the bracket 9 are reversed with respect to the positions which they occupy in the preceding views. The front or inner end of the arm 6 is secured to the frame by means of the bolt 11 and by means of a plurality of longitudinally spaced apertures 6ᶜ in the front portion of the arm. The rear portion 6ᵃ of the bumper-supporting arm is secured to the frame by the bolt 8, washer 13, and bracket 9, the rear portion of the arm being provided with the longitudinal slot 14 and the outer arm or branch of the bracket having the same vertical slot 9ᶜ as appears in the preceding views. The same lock plate 16, 16ᵃ is employed with the arm and bracket as is employed in the preceding views.

In Figs. 7, 8, 9 and 10 there is shown a further modification of the invention, wherein the parts 1—6ᵃ, inclusive, and the parts 7 and 8 are designated by the same numerals as are employed in connection with the preceding views, it being noted, however, that the inwardly offset rear or inner portion 6ᵃ of the bumper-supporting arm is inclined upwardly and is provided with an inclined slot 6ᶜ, for the reception of the bolt 8.

Instead of the bracket 9, there is shown an inverted U-shaped bracket 17 having the front or outer portion 6 of the bumper-supporting arm riveted thereto, as indicated at 17ᵃ. The opposite or inner arm of the bracket is provided with a series of apertures 17ᵇ, which are arranged in zigzag formation across the arm from top to bottom thereof, thereby forming means for supporting the arm in a variety of adjusted positions by the bolt 10. By means of the slot 6ᶜ and apertures 17ᵇ, the bumper may be quickly and conveniently adjusted inwardly, outwardly and vertically, in order to occupy the most efficient position.

In Figs. 11 and 12 there is shown a modification of the invention illustrated in the four preceding views, wherein the rear or inner portion 6ᵃ of the bumper-supporting arm is provided with a series of apertures 6ᵉ in place of the slot 6ᵈ, while the forward or outer portion 6 of such arm is carried by a bracket 17, similar to the like-designated bracket shown in Figs. 7-10, except that the outer arm of such bracket is of greater vertical extent than the inner and shorter arm and is provided with the adjustment apertures 17ᵇ, while the inner and shorter arm, connected to the frame 1 by the bolt 11, as in Fig. 10, the adjustment of the forward or outer portion of the arm in this case being effected by the apertures in the outer arm of the bracket and a bolt 18 extending through such arm and the proper aperture.

The constructions shown herein are each extremely efficient in operation, but very inexpensive of production and installation. In all forms of my invention, the bracket member is a relatively light and yieldable spacing and supporting member, serving not only as a means for adjustably supporting the arm with reference to the frame but also as a means for cushioning blows tending to move the arm 6 toward or from the frame.

Having thus described my invention, what I claim is:—

1. The combination, with a vehicle frame member, of a bumper-supporting arm, and means connecting longitudinally spaced portions of said arm with said member, said means including a looped spacing and supporting member connected to one of such spaced portions of said arm and providing with said member a vertically and longitudinally adjustable support for such portion of said arm.

2. The combination, with a vehicle frame member, of a bumper-supporting arm, the said arm having inner and outer offset portions, means adjustably connecting one of such portions to said frame member and means including a spacing member for adjustably connecting the other portion of said arm to said member.

3. The combination, with a vehicle frame member, of a bumper-supporting arm, the said arm having inner and outer offset portions, means connecting one of such portions to said frame member, and means including a spacing member for adjustably connecting the other portion of said arm to said member.

4. The combination, with a vehicle frame member, of a bumper-supporting arm, the said arm having inner and outer offset portions, means adjustably connecting one of such portions to said member, and means including a spacing member for adjustably connecting the other portion of said arm to said member.

5. The combination, with a vehicle frame member, of a bumper-supporting arm, means adjustably connecting the inner portion of said arm with said member, the outer portion of said arm being offset from the inner portion thereof, and a U-shaped bracket interposed between the outer portion of the arm and the said member and adjustably connected thereto.

6. The combination, with a vehicle frame member, of a bumper-supporting arm having offset inner and outer portions, means adjustably connecting the inwardly offset portion to said member, and means, including a U-shaped bracket interposed between the outwardly offset portion of said arm and said frame member, for adjustably securing such portion of said arm to said frame member.

7. The combination, with a vehicle frame member, of a bumper-supporting arm having offset inner and outer portions, means connecting the inwardly offset portion to said member, and means, including a U-shaped bracket interposed between the outwardly offset portion of said arm and said frame member, for securing such portion of said arm to said frame member.

8. The combination, with a vehicle frame member, of a bumper-supporting arm having inwardly and outwardly offset portions, means for adjustably connecting the inwardly offset portion to said member, and means for adjustably connecting the outwardly offset portion to said member, the last-mentioned means comprising a U-shaped bracket having one arm thereof provided with a series of vertically spaced apertures and the other arm provided with a vertical slot; a bolt cooperating with said apertures for securing the bracket to said frame member, the outwardly offset portion of the bumper-supporting arm having a longitudinal slot arranged to intersect the first-mentioned slot, a bolt extending through said slots, and a locking plate mounted on said bolt and having its upper end deflected inwardly to engage the upper end of the cooperating bracket arm.

9. The combination, with a vehicle frame member, of a bumper-supporting arm having inwardly and outwardly offset portions, means for connecting the inwardly offset portion to said member, and means for adjustably connecting the outwardly offset portion to said member, the last-mentioned means comprising a U-shaped bracket having one arm thereof provided with a series of vertically spaced apertures and the other arm provided with a slot, a bolt cooperating with one of said bracket arms for adjustably securing the bracket to said frame member, the outwardly offset portion of the bumper-supporting arm having a longitudinal slot, a bolt extending through the last-mentioned slot and the other bracket arm, and a locking plate mounted on said bolt and having a portion arranged to engage the upper end of the last-mentioned bracket arm.

10. The combination, with a vehicle frame member, of a bumper-supporting arm having inwardly and outwardly offset portions, means adjustably connecting the inwardly offset portion of said arm to said member, a U-shaped bracket and means for adjustably securing one arm of the same to said member, the other arm of said bracket having a vertical slot, a bolt extending through said slot and through the outwardly offset portion of the bumper-supporting arm, and a locking plate mounted on said bolt and having a portion adapted to engage the top of the second bracket arm, thereby to hold the said bolt in fixed relation to said slot.

11. The combination, with the side member of a vehicle, of a bumper, a supporting arm connected at one end with said bumper and having its inner or rear end offset inwardly or toward the frame with respect to its outer portion, means adjustably connecting the rear or inner end of such arm with the said frame member, and a yieldable spacing member adjustably supporting the outer portion of such arm from said member.

12. The combination, with the side member of a vehicle, of a bumper, a supporting arm connected at one end with said bumper, means connecting the rear or inner end of such arm with the said frame member, and a yieldable spacing member adjustably supporting the outer portion of such arm from said member.

13. The combination, with the side member of a vehicle, of a bumper-supporting arm of a vehicle, adjustably connected at its rear or inner end with said member and having its front or outer portion offset from the rear or inner portion thereof, a U-shaped bracket having a series of vertically spaced apertures therein and connected to the outer or front portion of said arm, and means adapted to cooperate with the said apertures for securing the said arm to the said frame.

14. The combination, with the side member of a vehicle, of a bumper supporting arm connected at its rear or inner end with said member, a U-shaped bracket having a series of vertically spaced apertures therein and connected to the outer or front portion of said arm, and means adapted to cooperate with the said apertures for securing the said arm to the said frame.

15. The combination, with a vehicle frame member, of a bumper supporting arm, means connecting a portion of the said arm with said member, and a looped spacing and supporting member connected to another portion of said arm and providing a vertically and longitudinally adjustable support for said arm from said member.

16. The combination, with a vehicle frame member, of a bumper-supporting arm, means adjustably connecting a portion of the said arm with said member, and a spacing and supporting member connected to the other portion of said arm and providing a vertically and longitudinally adjustable support for said arm from said member.

17. The combination, with a vehicle frame member, of a bumper-supporting arm, the said arm having inner and outer offset portions, means connecting one of such portions to said frame member, and means including a resilient spacing member for adjustably connecting the other portion of said arm to said member.

18. The combination, with a vehicle frame member, of a bumper-supporting arm, the said arm having inner and outer offset portions, means adjustably connecting one of such portions to said member, and means including a resilient spacing member for adjustably connecting the other portion of said arm to said member.

19. The combination, with a vehicle frame member, of a bumper-supporting arm, the said arm having inner and outer offset portions, means connecting one of such portions to said frame member and means including a looped spacing member for connecting the other portion of said arm to said member.

In testimony whereof, I hereunto affix my signature.

WAYNE E. DUNSTON.